US012755186B2

(12) United States Patent
Singh

(10) Patent No.: US 12,755,186 B2
(45) Date of Patent: Oct. 6, 2026

(54) CONTAINERIZATION OF LEGACY APPLICATIONS USING QUANTUM COMPUTING

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 695 days.

(21) Appl. No.: 18/314,645

(22) Filed: May 9, 2023

(65) Prior Publication Data

US 2024/0378482 A1 Nov. 14, 2024

(51) Int. Cl.

| | |
|---|---|
| ***G06N 10/80*** | (2022.01) |
| ***G06N 10/20*** | (2022.01) |
| ***G06N 10/60*** | (2022.01) |

(52) U.S. Cl.

CPC ............. *G06N 10/80* (2022.01); *G06N 10/20* (2022.01); *G06N 10/60* (2022.01)

(58) Field of Classification Search

CPC ........ G06N 10/80; G06N 10/20; G06N 10/60; G06N 10/00; G06F 9/5088; G06F 9/5033; G06F 9/5061; G06F 9/5077; G06F 9/5066; G06F 9/50; G06F 9/5005; G06F 9/5027

USPC ............................................................ 706/62

See application file for complete search history.

(56) References Cited

U.S. PATENT DOCUMENTS

| | | | |
|---|---|---|---|
| 9,774,401 | B1 | 9/2017 | Borrill |
| 10,613,791 | B2 | 4/2020 | Meister et al. |
| 10,871,922 | B2 | 12/2020 | East |
| 10,884,636 | B1 | 1/2021 | Abrol et al. |
| 10,917,471 | B1 | 2/2021 | Karumbunathan et al. |
| 10,976,962 | B2 | 4/2021 | Karumbunathan et al. |
| 10,990,480 | B1 | 4/2021 | Bernat et al. |
| 11,042,452 | B1 | 6/2021 | Mcnutt |

(Continued)

OTHER PUBLICATIONS

Kelley et al., "Securing Cloud Containers Using Quantum Networking Channels", 2016 IEEE International Conference on Smart Cloud, Nov. 18-20, 2016, pp. 103-111. (Year: 2016).*

(Continued)

*Primary Examiner* — Hwei-Min Lu

(57) ABSTRACT

A method includes receiving an application code of a legacy application. The application code is analyzed to generate a plurality of container configurations for a containerized application. Each container configuration includes a plurality of container images and a plurality of application programming interfaces. An initial quantum state is generated from the plurality of container configurations. Each container configuration is simulated. A final quantum state is generated from the initial quantum state. The final quantum state includes performance scores for each container configuration represented using quantum bits. A total performance score is determined for each container configuration based on the performance scores and a rule. A highest total performance score is determined. An improved container configuration is determined from the plurality of container configurations based on the highest total performance score.

(Continued)

A containerized application code having the improved container configuration is deployed to a cloud computing system.

20 Claims, 3 Drawing Sheets

(56) References Cited

U.S. PATENT DOCUMENTS

| | | | | |
|---|---|---|---|---|
| 11,093,139 | B1 | 8/2021 | Karr et al. | |
| 11,263,096 | B1 | 3/2022 | Mcauliffe et al. | |
| 11,354,058 | B2 | 6/2022 | Bernat et al. | |
| 11,399,063 | B2 | 7/2022 | Narayanaswamy et al. | |
| 11,442,765 | B1 * | 9/2022 | Zhang | G06F 9/30145 |
| 11,455,409 | B2 | 9/2022 | Fisher et al. | |
| 11,487,878 | B1 * | 11/2022 | Zhang | G06F 9/5077 |
| 11,520,936 | B1 | 12/2022 | Frandzel et al. | |
| 11,550,514 | B2 | 1/2023 | Karr et al. | |
| 12,530,222 | B1 * | 1/2026 | Rivas | G06F 9/4843 |
| 2016/0261684 | A1 * | 9/2016 | Khalaf | G06F 9/45558 |
| 2019/0205106 | A1 * | 7/2019 | Sharma | G06F 8/427 |
| 2020/0142675 | A1 * | 5/2020 | Jaeger | G06F 8/427 |
| 2021/0081432 | A1 | 3/2021 | Grunwald et al. | |
| 2021/0194770 | A1 * | 6/2021 | Bhatnagar | G06F 9/5038 |
| 2021/0279066 | A1 * | 9/2021 | Xiao | G06F 9/45508 |
| 2021/0406151 | A1 * | 12/2021 | Durazzo | G06N 10/80 |
| 2022/0171648 | A1 * | 6/2022 | Rodriguez | G06F 9/45533 |
| 2022/0357975 | A1 * | 11/2022 | Huang | G06F 9/45545 |
| 2023/0004370 | A1 * | 1/2023 | Seth | G06F 9/5088 |
| 2023/0021723 | A1 * | 1/2023 | Karuppannan | H04L 67/148 |
| 2023/0244971 | A1 * | 8/2023 | Griffin | G06N 10/20 706/62 |
| 2024/0211276 | A1 * | 6/2024 | Vohra | G06F 9/4411 |

OTHER PUBLICATIONS

Trunov et al., "Container Cluster Model Development for Legacy Applications Integration in Scientific Software System", 2018 IEEE International Conference "Quality Management, Transport and Information Security, Information Technologies" (IT&QM&IS), Sep. 24-28, 2018, pp. 815-819. (Year: 2018).*

Dreher et al., "Prototype Container-Based Platform for Extreme Quantum Computing Algorithm Development", 2019 IEEE High Performance Extreme Computing Conference (HPEC), Sep. 24-26, 2019, pp. 1-7. (Year: 2019).*

Watada et al., "Emerging Trends, Techniques and Open Issues of Containerization: A Review", IEEE Access, vol. 7, Oct. 7, 2019, pp. 152443-152472. (Year: 2019).*

Haasjes, "Containerization of legacy applications", IBM Developer Article, https://developer.ibm.com/articles/containerization-of-legacy-applications/, Sep. 16, 2020, pp. 1-16. (Year: 2020).*

O'Meara et al., "Quantum Software Architecture Blueprints for the Cloud: Overview and Application to Peer-2-Peer Energy Trading", 2023 IEEE Conference on Technologies for Sustainability (SusTech), Apr. 19-22, 2023, pp. 191-198. (Year: 2023).*

Ballon, Alvaro; Photonic quantum computers—PennyLane documentation, May 31, 2022.

Hernandez, Rafael D.; The Model View Controller Pattern—MVC Architecture and Frameworks Explained (freecodecamp.org), Apr. 19, 2021.

Model-view-controller—Wikipedia.

* cited by examiner

CONTAINERIZATION OF LEGACY APPLICATIONS USING QUANTUM COMPUTING

TECHNICAL FIELD

The present disclosure relates generally to containerization of applications, and more specifically to a system and method for containerization of legacy applications using quantum computing.

BACKGROUND

One objective of migrating legacy applications from monolithic platforms into cloud computing platforms is to provide a more agile and scalable environment for individual modules and features of the applications. This allows the modules and features to be more easily managed and updated in cloud computing platforms. Migrating a legacy application to a plurality of containers is a complex activity that consumes significant computing resources, such as memory, processing time, and/or network bandwidth.

SUMMARY

The system described in the present disclosure provides several practical applications and technical advantages that overcome the current technical problems with containerization of applications.

In general, a system for containerization of legacy applications using quantum computing comprises a container generation system, a converter system, and a quantum computing system coupled to each other via a network. The container generation system receives an application code of a legacy application. The container generation system analyzes the application code and determines a plurality of logical units of the legacy application. The container generation system clusters the plurality of logical units into a plurality of clusters and determines a plurality of interaction flows between the plurality of clusters. The container generation system generates a respective container image for each cluster and maps the interaction flows to respective application programming interfaces (APIs). The container generation system generates a plurality of container configurations. Each container configuration comprises respective container images and respective APIs.

The converter system receives the container configurations from the container generation system and converts the container configurations from classical binary bits into quantum bits to generate a first quantum state. The first quantum state comprises a same information as the container configurations but encoded by quantum bits.

The quantum computing system receives the first quantum state from the converter system and simulates each of the plurality of container configurations. The simulation process determines values of performance parameters for each of the plurality of container configurations. The performance parameters may include memory utilization, network bandwidth utilization, API call volume, central processing unit (CPU) performance, graphics processing unit (GPU) performance, and data security. The quantum computing system generate a second quantum state from the first quantum state as a result of the simulation process. In some embodiments, the second quantum state comprises respective performance scores for each container configuration represented by quantum bits.

The converter system receives the second quantum state from the quantum computing system and determines respective performance scores for each container configuration represented by classical binary bits by converting the second quantum state from quantum bits to classical binary bits. The performance scores correspond to respective performance parameters. The performance scores include memory utilization score, network bandwidth utilization score, API call volume score, central processing unit (CPU) performance score, graphics processing unit (GPU) performance score, and data security score.

The container generation system receives the performance scores and selects a rule. The rule includes weights that correspond to the performance parameters. The rule may be selected based on desired performance of a containerized application code. In some embodiments, the selected rule comprises a weight corresponding to a desired performance parameter that is greater than other weights.

The container generation system determines a respective total performance score for each container configuration from the respective performance scores based on the selected rule. In some embodiments, a total performance score for a container configuration is determined by summing the respective performance scores multiplied by respective weights of the selected rule.

The container generation system determines a highest total performance score from the total performance scores and an improved container configuration based on the highest total performance score. The container generation system deploys the containerized application code having the improved container configuration to the cloud computing system.

The system for containerization of legacy applications using quantum computing allows for generated a containerized application that has a desired improved performance. By generating a containerized application that has a desired improved performance, performance of a cloud computing system is improved. For example, by generating a containerized application that has optimized memory utilization, memory utilization of a cloud computing system is improved. For example, by generating a containerized application that has optimized network bandwidth utilization, network bandwidth utilization of a cloud computing system is improved. The transformation of the container configurations from classical binary bits to quantum bits allows for applying quantum algorithms (e.g., as quantum optimization algorithms) using quantum processors. By using quantum processors implementing quantum algorithms, speed of operations is increased due to quantum parallelism compared to classical algorithms executed by classical processors.

Accordingly, the following disclosure is particularly integrated into practical applications of: (1) generating a containerized application that has a desired improved performance; (2) improving speed of a containerization process by using quantum algorithms implemented by quantum processors; and (3) improving computing resource utilization by a cloud computing system.

In one embodiment, a system includes a container generation system and a quantum computing system communicatively coupled to the container generation system. The container generation system includes a classical processor configured to receive an application code of a legacy application and containerize the legacy application to generate a containerized application code of a containerized application. Containerizing the legacy application includes analyzing the application code to generate a plurality of container configurations for the containerized application. Each container configuration includes a plurality of container images and a plurality of application programming interfaces (APIs). Generating each container configuration includes determining a plurality of logical units of the legacy application, clustering the plurality of logical units into a plurality of clusters, determining a plurality of interaction flows between the plurality of clusters, generating a respective container image for each cluster, and mapping the plurality of interaction flows to the plurality of APIs. Containerizing the legacy application further includes receiving performance scores for each container configuration, determining a total performance score for each container configuration based on the performance scores and a rule, determining a highest total performance score, and determining an improved container configuration from the plurality of container configurations based on the highest total performance score. The classical processor is further configured to deploy the containerized application code having the improved container configuration to a cloud computing system. The quantum computing system includes a quantum processor configured to receive an initial quantum state, simulate each container configuration, and generate a final quantum state from the initial quantum state. The initial quantum state includes the plurality of container configurations represented using quantum bits.

The final quantum state includes the performance scores for each container configuration represented using quantum bits.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

As described above, previous technologies fail to provide effective systems and methods for containerization of legacy applications. Embodiments of the present disclosure and their advantages may be understood by referring to FIGS. 1, 2A, 2B, and 3. FIGS. 1, 2A, 2B, and 3 are used to describe a system and method for containerization of legacy applications using quantum computing.

System Overview

Figure 1:
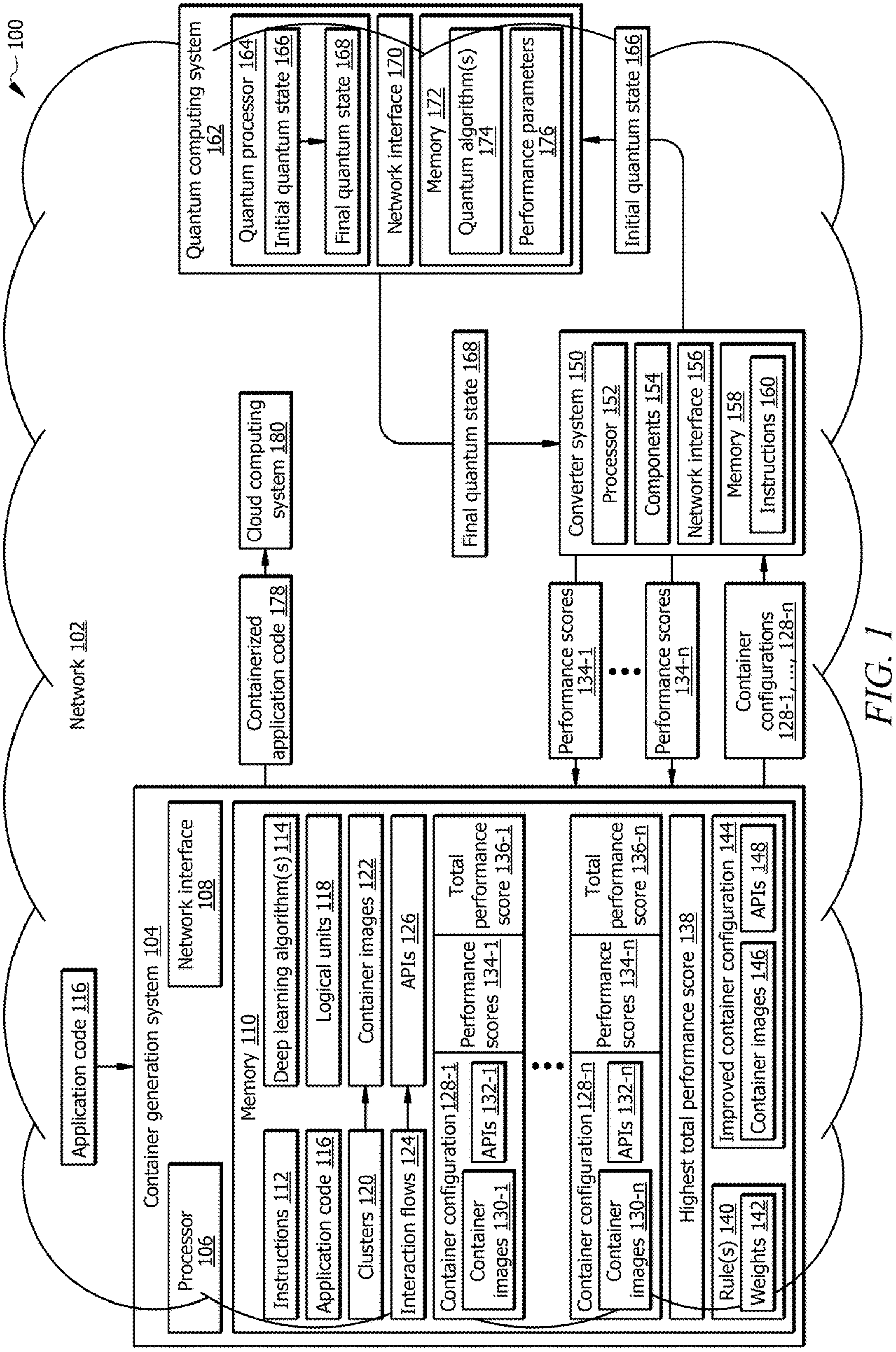
FIG. 1 illustrates an embodiment of a system for containerization of legacy applications using quantum computing.

FIG. 1 illustrates an embodiment of a system 100 for containerization of legacy applications using quantum computing. In certain embodiments, the system 100 comprises a container generation system 104, a converter system 150, and a quantum computing system 162 coupled to each other via a network 102. Network 102 enables the communication between the components of the system 100. The system 100 may be coupled to a cloud computing system 180 via the network 102. In other embodiments, the system 100 may not have all the components listed and/or may have other elements instead of, or in addition to, those listed above. For example, the converter system 150 and the quantum computing system 162 may be integrated into a single system. For another example, the container generation system 104, the converter system 150, and the quantum computing system 162 may be integrated into a single system.

In general, the container generation system 104 receives an application code 116 of an application. In certain embodiments, the application is a legacy application. The container generation system 104 analyzes the application code 116 and determines a plurality of logical units 118 of the application. In certain embodiments, the logical units 118 may include Model-Viewer-Controller (MVC) components of the application. The container generation system 104 clusters the plurality of logical units 118 into a plurality of clusters 120 and determines a plurality of interaction flows 124 between the plurality of clusters 120. The container generation system 104 generates a respective container image (e.g., respective one of container images 122) for each cluster (e.g., respective one of clusters 120) and maps the interaction flows 124 to respective application programming interfaces (APIs) 126. The container generation system 104 generates a plurality of container configurations 128-1 through **128-*n*. Each container configuration (e.g., respective one of container configuration 128-1 through 128-*n*) comprises respective container images (e.g., respective container images 130-1 through 130-*n*) and respective APIs (e.g., respective APIs 132-1 through 132-*n***).

The converter system 150 receives the container configurations 128-1 through **128-*n* from the container generation system 104 and converts the container configurations 128-1 through 128-*n* from classical binary bits into quantum bits to generate a first quantum state 166. The first quantum state 166 comprises a same information as the container configurations 128-1 through 128-*n*** but encoded by quantum bits.

The quantum computing system 162 receives the first quantum state 166 from the converter system 150 and simulates each of the plurality of container configurations 128-1 through **128-*n*. The simulation process determines values of performance parameters 176 for each of the plurality of container configurations 128-1 through 128-*n*. The performance parameters 176 may include memory utilization, network bandwidth utilization, API call volume, central processing unit (CPU) performance, graphics processing unit (GPU) performance, and data security. The quantum computing system 162 generate a second quantum state 168 from the first quantum state 166 as a result of the simulation process. In some embodiments, the second quantum state 168 comprises respective performance scores (e.g., respective performance scores 134-1 through 134-*n*) for each container configuration (e.g., respective one of container configurations 128-1 through 128-*n***) represented by quantum bits.

The converter system 150 receives the second quantum state 168 from the quantum computing system 162 and determines respective performance scores (e.g., respective performance scores 134-1 through **134-*n*) for each container configuration (e.g., respective one of container configurations 128-1 through 128-*n*) represented by classical binary bits by converting the second quantum state 168 from quantum bits to classical binary bits. The performance scores correspond to respective performance parameters 176. For example, performance scores 134-1 through 134-*n* of the container configurations 128-1 through 128-*n*** include memory utilization score, network bandwidth utilization score, API call volume score, central processing unit (CPU) performance score, graphics processing unit (GPU) performance score, and/or data security score.

The container generation system 104 receives the performance scores 134-1 through **134-*n* and selects a rule 140. The rule 140 includes weights 142 that correspond to performance parameters 176. The rule 140 may be selected based on desired performance of a containerized application code 178. In some embodiments, the selected rule 140 comprises a weight 142 corresponding to a desired performance parameter that is greater than other wights 142**.

The container generation system 104 determines a respective total performance score (e.g., respective one of total performance scores 136-1 through **136-*n*) for each container configuration (e.g., respective one of container configurations 128-1 through 128-*n*) from the respective performance scores (e.g., respective performance scores 134-1 through 134-*n*) based on the selected rule 140. In some embodiments, a total performance score (e.g., respective one of total performance scores 136-1 through 136-*n*) for a container configuration (e.g., respective one of container configurations 128-1 through 128-*n*) is determined by summing the respective performance scores (e.g., respective performance scores 134-1 through 134-*n*) multiplied by respective weights 142 of the selected rule 140**.

The container generation system 104 determines a highest total performance score 138 from the total performance scores 136-1 through **136-*n* and an improved container configuration 144 based on the highest total performance score 138. The container generation system 104 deploys a containerized application code 178 having the improved container configuration 144 to the cloud computing system 180**.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi®, WiGig®, WiMax®, etc.), a long-term evolution (LTE) network, a universal mobile telecommunications system (UMTS) network, a peer-to-peer (P2P) network, a Bluetooth® network, a near field communication (NFC) network, and/or any other suitable network. The network 102 may be configured to support any suitable type of communication protocol as would be appreciated by one of ordinary skill in the art.

Cloud Computing System

The cloud computing system 180 is configured to process data and communicate with the system 100 via the network 102. The cloud computing system 180 may comprise a plurality of computing nodes (not explicitly shown). Each node may include a hardware processor, network interface, memory, and/or circuitry (not explicitly shown) configured to perform any of the functions or actions of the cloud computing system 180 described herein. For example, instructions may be stored in the memory and executed by the hardware processor to perform the functions of the cloud computing system 180. In operation, the system 100 generates a containerized application code 178 from an application code 116 and deploys the containerized application code 178 to the cloud computing system 180.

Container Generation System

The container generation system 104 is generally any device that is configured to process data and communicate with other components of the system 100 via the network 102. The container generation system 104 may comprise a processor 106 in signal communication with a memory 110 and a network interface 108.

Processor 106 comprises one or more processors operably coupled to the memory 110. The processor 106 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 106 may be a programmable logic device, a microcontroller, a microprocessor, or any suitable combination of the preceding. The one or more processors are configured to process data and may be implemented in hardware or software. For example, the processor 106 may be 8-bit, 16-bit, 32-bit, 64-bit, or of any other suitable architecture. The one or more processors are configured to implement various software instructions to perform the operations described herein. For example, the one or more processors are configured to execute software instructions 112 and/or deep learning algorithms 114, and perform one or more functions described herein. The processor 106 may be also referred to as a classical processor.

Network interface 108 is configured to enable wired and/or wireless communications (e.g., via network 102). The network interface 108 is configured to communicate data between the container generation system 104 and other components of the system 100. For example, the network interface 108 may comprise a WIFI® interface, a local area network (LAN) interface, a wide area network (WAN) interface, a modem, a switch, or a router. The processor 106 is configured to send and receive data using the network interface 108. The network interface 108 may be configured to use any suitable type of communication protocol as would be appreciated by one of ordinary skill in the art.

Memory 110 may be volatile or non-volatile and may comprise a read-only memory (ROM), random-access memory (RAM), ternary content-addressable memory (TCAM), dynamic random-access memory (DRAM), and static random-access memory (SRAM). Memory 110 may be implemented using one or more disks, tape drives, solid-state drives, and/or the like. The memory 110 may store any of the information described in FIGS. 1, 2A, 2B, and 3 along with any other data, instructions, logic, rules, or code operable to implement the function(s) described herein. The memory 110 is operable to store software instructions 112, deep learning algorithms 114, and/or any other data and instructions. The software instructions 112 and the deep learning algorithms 114 may comprise any suitable set of software instructions, logic, rules, or code operable to be executed by the processor 106. The deep learning algorithms 114 may comprise a knowledge graph algorithm, a clustering algorithm, a generative adversarial network (GAN) algorithm, and/or an abstract syntax tree algorithm.

In operation, a processor 106 of a container generation system 104 receives an application code 116 of an application. In certain embodiments, the application is a legacy application. The processor 106 of the container generation system 104 analyzes the application code 116. The analyzing process may include executing one or more deep learning algorithms 114 by the processor 106. The deep learning algorithms 114 may include a knowledge graph algorithm, a clustering algorithm, a generative adversarial network (GAN) algorithm, and/or an abstract syntax tree algorithm. As a result of the analyzing process, the processor 106 of the container generation system 104 determines a plurality of logical units 118 of the application. In certain embodiments, the logical units 118 may include Model-Viewer-Controller (MVC) components of the application. The processor 106 of the container generation system 104 clusters the plurality of logical units 118 into a plurality of clusters 120. The clustering process may include executing one or more deep learning algorithms 114 by the processor 106. The processor 106 of the container generation system 104 determines a plurality of interaction flows 124 between the plurality of clusters 120. The interaction flows 124 may be also referred to as data flows. The processor 106 of the container generation system 104 generates a respective container image (e.g., respective one of container images 122) for each cluster (e.g., respective one of clusters 120). The container image generation process includes executing one or more deep learning algorithms 114 by the processor 106. In certain embodiments, the container image generation process includes executing a generative adversarial network (GAN) algorithm by the processor 106. The processor 106 of the container generation system 104 maps the interaction flows 124 to respective application programming interfaces (APIs) 126.

The processor 106 of the container generation system 104 generates a plurality of container configurations 128-1 through **128-*n*. Each container configuration (e.g., respective one of container configuration 128-1 through 128-*n*) comprises respective container images (e.g., respective container images 130-1 through 130-*n*) and respective APIs (e.g., respective APIs 132-1 through 132-*n*). For example, the container configuration 128-1 comprises container images 130-1 and APIs 132-1. For another example, the container configuration 128-*n* comprises container images 130-*n* and APIs 132-*n***. In some embodiments, different container configurations comprise different number of container images. In other embodiments, different container configurations comprise different number of APIs.

Figure 2A:
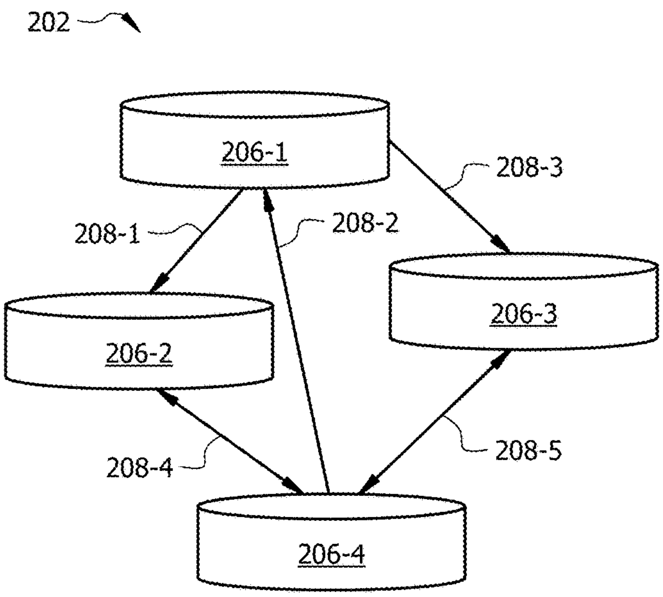
FIGS. 2A and 2B illustrate examples of container configurations.
Figure 2B:
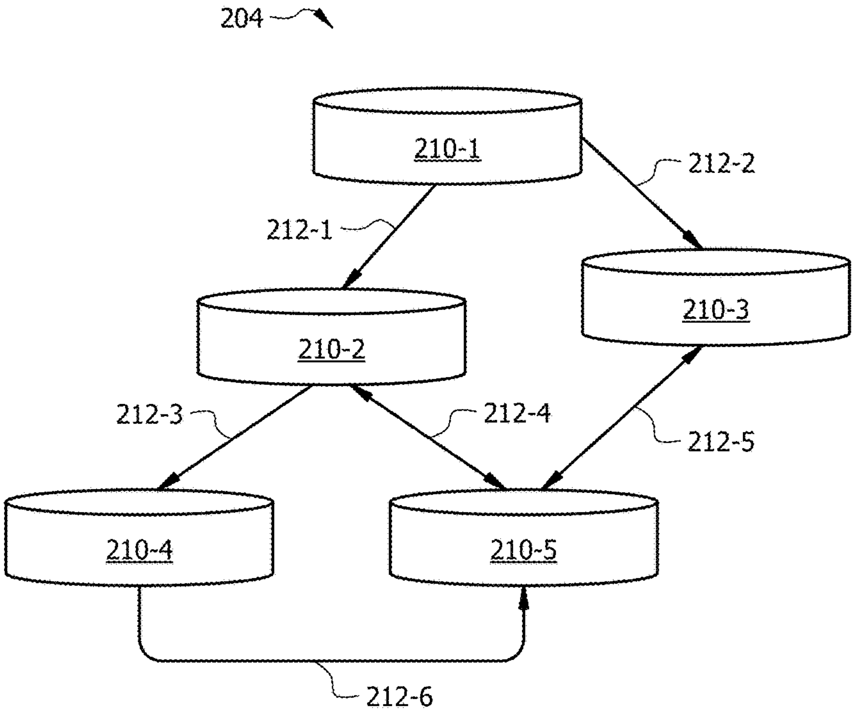

FIGS. 2A and 2B illustrate examples of container configurations 202 and 204, respectively. The container configuration 202 comprises container images 206-1 through 206-4 and APIs 208-1 through 208-5. The container configuration 204 comprises container images 210-1 through 210-5 and APIs 212-1 through 212-6.

The processor 106 of the container generation system 104 further receives the performance scores 134-1 through **134-*n* for the container configuration 128-1 through 128-*n* and selects a rule 140. The rule 140 includes weights 142 that correspond to performance parameters 176. The rule 140 may be selected based on desired performance of a containerized application code 178. In some embodiments, the selected rule 140 has a weight 142 corresponding to a desired performance parameter greater than other weights 142. For example, if the containerized application code 178 with improved memory utilization is desired, the selected rule 140 has a weight 142 corresponding to the memory utilization greater than other weights 142. For another example, if the containerized application code 178 with improved data security is desired, the selected rule 140 has a weight 142 corresponding to the data security greater than other weights 142**.

The processor 106 of the container generation system 104 determines a respective total performance score (e.g., respective one of total performance scores 136-1 through **136-*n*) for each container configuration (e.g., respective one of container configurations 128-1 through 128-*n*) from the respective performance scores (e.g., respective performance scores 134-1 through 134-*n*) based on the selected rule 140. In some embodiments, a total performance score (e.g., respective one of total performance scores 136-1 through 136-*n*) for a container configuration (e.g., respective one of container configurations 128-1 through 128-*n*) is determined by summing the respective performance scores (e.g., respective performance scores 134-1 through 134-*n*) multiplied by respective weights 142 of the selected rule 140. For example, the total performance score 136-1 for the container configuration 128-1 is determined by summing the performance scores 134-1 multiplied by respective weights 142 of the selected rule 140**.

The processor 106 of the container generation system 104 determines a highest total performance score 138 from the total performance scores 136-1 through **136-*n* and an improved container configuration 144 based on the highest total performance score 138. The improved container configuration 144 comprises container images 146 and APIs 148. For example, if the processor 106 of the container generation system 104 determines that the total performance score 136-1 for the container configuration 128-1 is the highest total performance score 138, the processor 106 of the container generation system 104 determines that the container configuration 128-1 is the improved container configuration 144, with the container images 130-1 identified as the container images 146 and the APIs 132-1 identified as the APIs 148. The processor 106 of the container generation system 104 deploys a containerized application code 178 having the improved container configuration 144 to a cloud computing system 180**.

Converter System

The converter system 150 is generally any device that is configured to process data and communicate with other components of the system 100 via the network 102. The converter system 150 may comprise a processor 152 and components 154 in signal communication with a memory 158 and a network interface 156.

Processor 152 comprises one or more processors operably coupled to the memory 158. The processor 152 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 152 may be a programmable logic device, a microcontroller, a microprocessor, or any suitable combination of the preceding. The one or more processors are configured to process data and may be implemented in hardware or software. For example, the processor 152 may be 8-bit, 16-bit, 32-bit, 64-bit, or of any other suitable architecture. The one or more processors are configured to implement various software instructions to perform the operations described herein. For example, the one or more processors are configured to execute software instructions 160 and perform one or more functions described herein. The processor 152 may be also referred to as a classical processor.

Network interface 156 is configured to enable wired and/or wireless communications (e.g., via network 102). The network interface 156 is configured to communicate data between the converter system 150 and other components of the system 100. For example, the network interface 156 may comprise a WIFI® interface, a local area network (LAN)

interface, a wide area network (WAN) interface, a modem, a switch, or a router. The processor 152 is configured to send and receive data using the network interface 156. The network interface 156 may be configured to use any suitable type of communication protocol as would be appreciated by one of ordinary skill in the art.

Memory 158 may be volatile or non-volatile and may comprise a read-only memory (ROM), random-access memory (RAM), ternary content-addressable memory (TCAM), dynamic random-access memory (DRAM), and static random-access memory (SRAM). Memory 158 may be implemented using one or more disks, tape drives, solid-state drives, and/or the like. The memory 158 may store any of the information described in FIGS. 1, 2A, 2B, and 3 along with any other data, instructions, logic, rules, or code operable to implement the function(s) described herein. The memory 158 is operable to store software instructions 160, and/or any other data and instructions. The software instructions 160 may comprise any suitable set of software instructions, logic, rules, or code operable to be executed by the processor 152.

The converter system 150 is configured to convert information represented by classical binary bits to quantum bits. The converter system 150 is further configured to convert information represented by quantum bits to classical binary bits. The components 154 comprise various components that are configured to generate and manipulate quantum bits. In certain embodiment when the components 154 are configured to generate and manipulate photonic quantum bits (e.g., quantum bits implemented by modes of photons), the components 154 may comprise optical components such as lasers, mirrors, prisms, waveguides, interferometers, optical fibers, filters, polarizers, phase shifters, beam splitters, and/or lenses.

In operation, the converter system 150 receives the container configurations 128-1 through **128-*n* from the container generation system 104 and converts the container configurations 128-1 through 128-*n* from classical binary bits into quantum bits to generate a first quantum state 166. The first quantum state 166 may be also referred to as an initial quantum state. The first quantum state 166 comprises a same information as the container configurations 128-1 through 128-*n* but encoded by quantum bits. In some embodiments, the processor 152 and the components 154 of the converter system 150 are configured to transform the container configurations 128-1 through 128-*n* into the first quantum state 166**.

The converter system 150 further receives the second quantum state 168 from the quantum computing system 162 and determines respective performance scores (e.g., respective performance scores 134-1 through **134-*n*) for each container configuration (e.g., respective one of container configurations 128-1 through 128-*n*) represented by classical binary bits by converting the second quantum state 168 from quantum bits to classical binary bits. The performance scores correspond to respective performance parameters 176. For example, performance scores 134-1 through 134-*n* of the container configurations 128-1 through 128-*n*** include memory utilization score, network bandwidth utilization score, API call volume score, central processing unit (CPU) performance score, graphics processing unit (GPU) performance score, and data security score.

Quantum Computing System

The quantum computing system 162 is generally a device that is configured to process data and communicate with other components of the system 100 via the network 102. The quantum computing system 162 may comprise a quantum processor 164 in signal communication with a memory 172 and a network interface 170.

Quantum processor 164 may comprise one or more quantum processors operably coupled to the memory 172. The quantum processor 164 is configured to process quantum bits. The quantum processor 164 may comprise a superconducting quantum device (with quantum bits implemented by states of Josephson junctions), a trapped ion device (with quantum bits implemented by internal states of trapped ions), a trapped neutral atom device (with quantum bits implemented by internal states of trapped neutral atoms), a photon-based device (with quantum bits implemented by modes of photons), or any other suitable device that implements quantum bits with states of a respective quantum system. The quantum processor 164 is configured to execute quantum algorithms 174 and perform one or more functions described herein.

Network interface 170 is configured to enable wired and/or wireless communications (e.g., via network 102). The network interface 170 is configured to communicate data between the quantum computing system 162 and other components of the system 100. For example, the network interface 170 may comprise a WIFI® interface, a local area network (LAN) interface, a wide area network (WAN) interface, a modem, a switch, or a router. The quantum processor 164 is configured to send and receive data using the network interface 170. The network interface 170 may be configured to use any suitable type of communication protocol as would be appreciated by one of ordinary skill in the art.

Memory 172 may be volatile or non-volatile and may comprise a read-only memory (ROM), random-access memory (RAM), ternary content-addressable memory (TCAM), dynamic random-access memory (DRAM), and static random-access memory (SRAM). Memory 172 may be implemented using one or more disks, tape drives, solid-state drives, and/or the like. The memory 172 may store any of the information described in FIGS. 1, 2A, 2B, and 3 along with any other data, instructions, logic, rules, or code operable to implement the function(s) described herein. The memory 148 is operable to store one or more quantum algorithms 174, and/or any other data and instructions. The quantum algorithms 174 may comprise any suitable set of software instructions, logic, rules, or code operable to be executed by the quantum processor 164. The quantum algorithms 174 may comprise suitable quantum optimization algorithms.

In operation, the quantum processor 164 of the quantum computing system 162 receives the first quantum state 166 from the converter system 150 and simulates each of the plurality of container configurations 128-1 through **128-*n*. The simulation process determines values of performance parameters 176 for each of the plurality of container configurations 128-1 through 128-*n*. The performance parameters 176** may include memory utilization, network bandwidth utilization, API call volume, central processing unit (CPU) performance, graphics processing unit (GPU) performance, and data security.

The quantum processor 164 of the quantum computing system 162 generate a second quantum state 168 from the first quantum state 166 as a result of the simulation process. In some embodiments, the quantum processor 164 implements one or more quantum algorithms 174. The quantum algorithms 174 may include suitable quantum optimization algorithms. The second quantum state 168 may be also referred to as a final quantum state. In some embodiments, the second quantum state 168 comprises respective performance scores (e.g., respective performance scores 134-1 through 134-_n_) for each container configuration (e.g., respective one of container configurations 128-1 through 128-_n_) represented by quantum bits.

Figure 3:
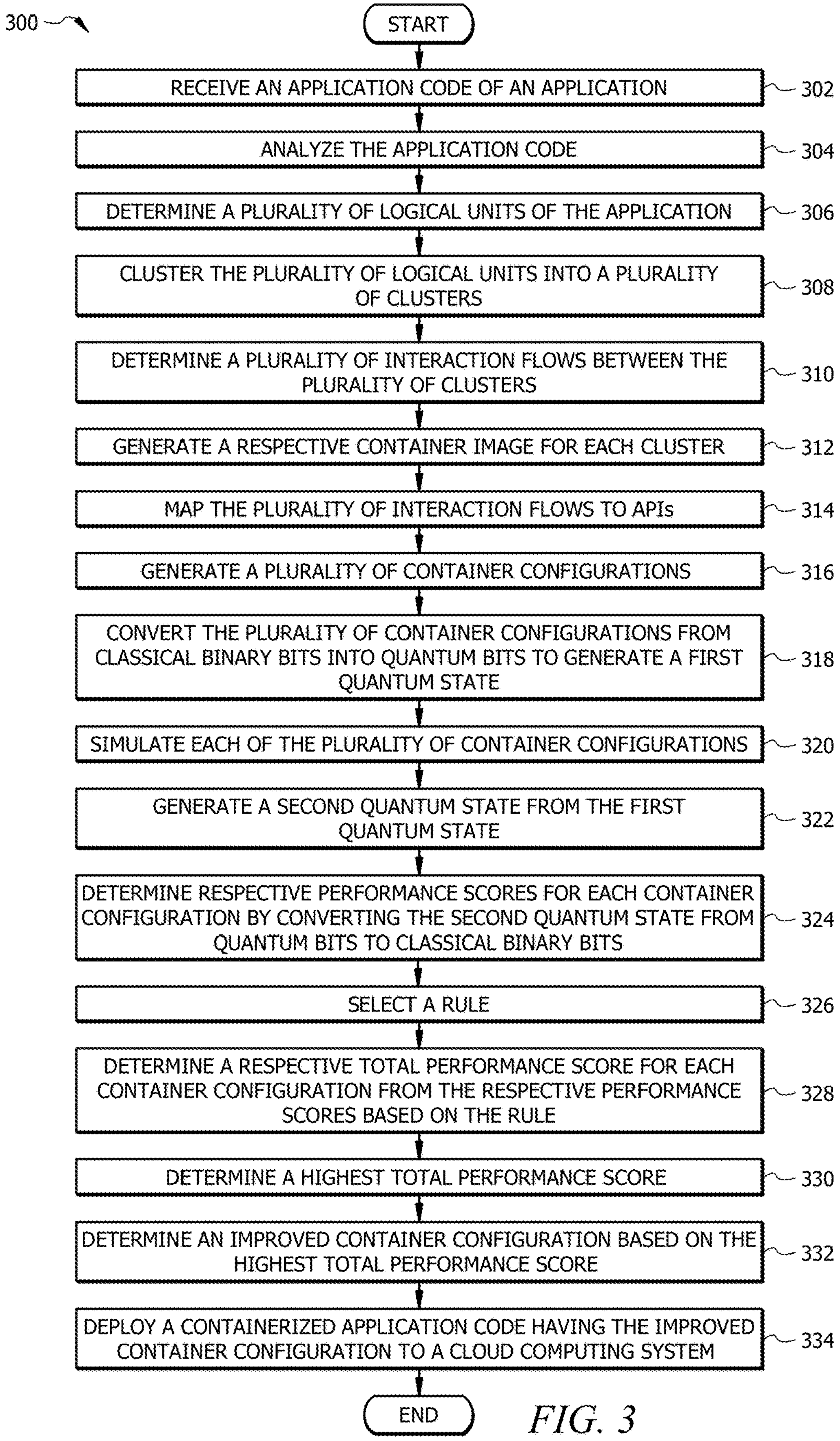
FIG. 3 illustrates an example operational flow of system of FIG. 1 for containerization of legacy applications using quantum computing.

Example Method for Containerization of Legacy Applications Using Quantum Computing FIG. 3 illustrates an example flowchart of a method 300 for containerization of legacy applications using quantum computing. Modifications, additions, or omissions may be made to method 300. Method 300 may include more, fewer, or other operations. For example, operations may be performed in parallel or in any suitable order. For example, one or more operations of method 300 may be implemented, at least in part, in the form of the software instructions (e.g., instructions 112 and/or 160 and algorithms 114 and/or 174 of FIG. 1), stored on non-transitory, tangible, machine-readable medium (e.g., memories 110, 158, and/or 172 of FIG. 1) that when executed by one or more processors (e.g., processors 106, 152, and/or 164 of FIG. 1) may cause the one or more processors to perform operations 302-334.

Method 300 starts with operation 302, where a processor 106 of a container generation system 104 receives an application code 116 of an application. In certain embodiments, the application is a legacy application.

At operation 304, the processor 106 of the container generation system 104 analyzes the application code 116. The analyzing process may include executing one or more deep learning algorithms 114 by the processor 106. The deep learning algorithms 114 may include a knowledge graph algorithm, a clustering algorithm, a generative adversarial network (GAN) algorithm, and/or an abstract syntax tree algorithm.

At operation 306, as a result of the analyzing process, the processor 106 of the container generation system 104 determines a plurality of logical units 118 of the application. In certain embodiments, the logical units 118 may include Model-Viewer-Controller (MVC) components of the application.

At operation 308, the processor 106 of the container generation system 104 clusters the plurality of logical units 118 into a plurality of clusters 120. The clustering process may include executing one or more deep learning algorithms 114 by the processor 106.

At operation 310, the processor 106 of the container generation system 104 determines a plurality of interaction flows 124 between the plurality of clusters 120. The interaction flows 124 may be also referred to as data flows.

At operation 312, the processor 106 of the container generation system 104 generates a respective container image (e.g., respective one of container images 122 of FIG. 1) for each cluster (e.g., respective one of clusters 120 of FIG. 1). The container image generation process includes executing one or more deep learning algorithms 114 by the processor 106. In certain embodiments, the container image generation process includes executing a generative adversarial network (GAN) algorithm by the processor 106.

At operation 314, the processor 106 of the container generation system 104 maps the interaction flows 124 to respective application programming interfaces (APIs) 126.

At operation 316, the processor 106 of the container generation system 104 generates a plurality of container configurations 128-1 through 128-_n_. Each container configuration (e.g., respective one of container configuration 128-1 through 128-_n_ of FIG. 1) comprises respective container images (e.g., respective container images 130-1 through 130-_n_ of FIG. 1) and respective APIs (e.g., respective APIs 132-1 through 132-_n_ of FIG. 1). For example, the container configuration 128-1 comprises container images 130-1 and APIs 132-1. For another example, the container configuration 128-_n_ comprises container images 130-_n_ and APIs 132-_n_. In some embodiments, different container configurations comprise different number of container images. In other embodiments, different container configurations comprise different number of APIs.

At operation 318, the converter system 150 receives the container configurations 128-1 through 128-_n_ from the container generation system 104 and converts the container configurations 128-1 through 128-_n_ from classical binary bits into quantum bits to generate a first quantum state 166. The first quantum state 166 may be also referred to as an initial quantum state. The first quantum state 166 comprises a same information as the container configurations 128-1 through 128-_n_ but encoded by quantum bits. In some embodiments, the processor 152 and the components 154 of the converter system 150 are configured to transform the container configurations 128-1 through 128-_n_ into the first quantum state 166.

At operation 320, a quantum processor 164 of a quantum computing system 162 receives the first quantum state 166 from the converter system 150 and simulates each of the plurality of container configurations 128-1 through 128-_n_. The simulation process determines values of performance parameters 176 for each of the plurality of container configurations 128-1 through 128-_n_. The performance parameters 176 may include memory utilization, network bandwidth utilization, API call volume, central processing unit (CPU) performance, graphics processing unit (GPU) performance, and data security.

At operation 322, the quantum processor 164 of the quantum computing system 162 generate a second quantum state 168 from the first quantum state 166 as a result of the simulation process. In some embodiments, the quantum processor 164 implements one or more quantum algorithms 174. The quantum algorithms 174 may include suitable quantum optimization algorithms. The second quantum state 168 may be also referred to as a final quantum state. In some embodiments, the second quantum state 168 comprises respective performance scores (e.g., respective performance scores 134-1 through 134-_n_ of FIG. 1) for each container configuration (e.g., respective one of container configurations 128-1 through 128-_n_ of FIG. 1) represented by quantum bits.

At operation 324, the converter system 150 receives the second quantum state 168 from the quantum computing system 162 and determines respective performance scores (e.g., respective performance scores 134-1 through 134-_n_ of FIG. 1) for each container configuration (e.g., respective one of container configurations 128-1 through 128-_n_ of FIG. 1) represented by classical binary bits by converting the second quantum state 168 from quantum bits to classical binary bits. The performance scores correspond to respective performance parameters 176. For example, performance scores 134-1 through 134-_n_ of the container configurations 128-1 through 128-_n_ include memory utilization score, network bandwidth utilization score, API call volume score, central processing unit (CPU) performance score, graphics processing unit (GPU) performance score, and data security score.

At operation 326, the processor 106 of the container generation system 104 receives the performance scores 134-1 through 134-_n_ and selects a rule 140. The rule 140 includes weights 142 that correspond to performance parameters 176. The rule 140 may be selected based on desired performance of a containerized application code 178. In some embodiments, the selected rule 140 has a weight 142 corresponding to a desired performance parameter greater than other weights 142. For example, if the containerized application code 178 with improved memory utilization is desired, the selected rule 140 has a weight 142 corresponding to the memory utilization greater than other weights 142. For another example, if the containerized application code 178 with improved data security is desired, the selected rule 140 has a weight 142 corresponding to the data security greater than other weights 142.

At operation 328, the processor 106 of the container generation system 104 determines a respective total performance score (e.g., respective one of total performance scores 136-1 through **136-*n* of FIG. 1) for each container configuration (e.g., respective one of container configurations 128-1 through 128-*n* of FIG. 1) from the respective performance scores (e.g., respective performance scores 134-1 through 134-*n* of FIG. 1) based on the selected rule 140. In some embodiments, a total performance score (e.g., respective one of total performance scores 136-1 through 136-*n* of FIG. 1) for a container configuration (e.g., respective one of container configurations 128-1 through 128-*n* of FIG. 1) is determined by summing the respective performance scores (e.g., respective performance scores 134-1 through 134-*n* of FIG. 1) multiplied by respective weights 142 of the selected rule 140. For example, the total performance score 136-1 for the container configuration 128-1 is determined by summing the performance scores 134-1 multiplied by respective weights 142 of the selected rule 140**.

At operation 330, the processor 106 of the container generation system 104 determines a highest total performance score 138 from the total performance scores 136-1 through **136-*n***.

At operation 332, the processor 106 of the container generation system 104 determines an improved container configuration 144 based on the highest total performance score 138. The improved container configuration 144 comprises container images 146 and APIs 148. For example, if the processor 106 of the container generation system 104 determines that the total performance score 136-1 for the container configuration 128-1 is the highest total performance score 138, the processor 106 of the container generation system 104 determines that the container configuration 128-1 is the improved container configuration 144, with the container images 130-1 identified as the container images 146 and the APIs 132-1 identified as the APIs 148.

At operation 334, the processor 106 of the container generation system 104 deploys a containerized application code 178 having the improved container configuration 144 to a cloud computing system 180. After performing operation 334, method 300 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:

a container generation system, the container generation system comprising:

a first classical processor configured to:

receive an application code of a legacy application; and containerize the legacy application to generate a containerized application code of a containerized application, wherein containerizing the legacy application comprises:

analyzing the application code to generate a plurality of container configurations for the containerized application, wherein each container configuration comprises a plurality of container images and a plurality of application programming interfaces (APIs), and wherein generating said each container configuration comprises:

determining a plurality of logical units of the legacy application;

clustering the plurality of logical units into a plurality of clusters;

determining a plurality of interaction flows between the plurality of clusters;

generating a respective container image for each cluster; and mapping the plurality of interaction flows to the plurality of APIs;

receiving performance scores for said each container configuration;

determining a total performance score for said each container configuration based on the performance scores and a rule;

determining a highest total performance score; and determining an improved container configuration from the plurality of container configurations based on the highest total performance score; and deploy the containerized application code having the improved container configuration to a cloud computing system; and a quantum computing system communicatively coupled to the container generation system, the quantum computing system comprising:

a quantum processor configured to:

receive an initial quantum state, wherein the initial quantum state comprises the plurality of container configurations represented using a format of quantum bits;

simulate said each container configuration; and generate a final quantum state from the initial quantum state, wherein the final quantum state comprises the performance scores for said each container configuration represented using the format of quantum bits.

2. The system of claim 1, wherein the performance scores comprise at least one or more of a memory utilization score, a network bandwidth utilization score, an API call volume score, a central processing unit performance score, a graphics processing unit performance score, or a data security score.

3. The system of claim 1, further comprising:

a converter system communicatively coupled to the quantum computing system and the container generation system, wherein the converter system comprises a second classical processor that is configured to:

receive the plurality of container configurations from the container generation system;

generate the initial quantum state from the plurality of container configurations;

send the initial quantum state to the quantum computing system;

receive the final quantum state from the quantum computing system; and determine the performance scores for said each container configuration from the final quantum state.

4. The system of claim 3, wherein determining the performance scores for said each container configuration from the final quantum state comprises: converting the final quantum state from the format of quantum bits to a format of classical binary bits.

5. The system of claim 1, wherein:

the rule defines a plurality of weights; and determining the total performance score for said each container configuration based on the performance scores and the rule comprises:

summing the performance scores multiplied by respective weights.

6. The system of claim 1, wherein a first container configuration of the plurality of container configurations and a second container configuration of the plurality of container configurations comprise different number of container images.

7. The system of claim 6, wherein the first container configuration of the plurality of container configurations and the second container configuration of the plurality of container configurations comprise different number of APIs.

8. A method comprising:

receiving an application code of a legacy application;

containerizing the legacy application to generate a containerized application code of a containerized application, wherein containerizing the legacy application comprises:

analyzing the application code to generate a plurality of container configurations for the containerized application, wherein each container configuration comprises a plurality of container images and a plurality of application programming interfaces (APIs), and wherein generating said each container configuration comprises:

determining a plurality of logical units of the legacy application;

clustering the plurality of logical units into a plurality of clusters;

determining a plurality of interaction flows between the plurality of clusters;

generating a respective container image for each cluster; and mapping the plurality of interaction flows to the plurality of APIs;

generating an initial quantum state from the plurality of container configurations;

simulating said each container configuration;

generating a final quantum state from the initial quantum state, wherein the final quantum state comprises performance scores for said each container configuration represented using a format of quantum bits;

determining a total performance score for said each container configuration based on the performance scores and a rule;

determining a highest total performance score;

determining an improved container configuration from the plurality of container configurations based on the highest total performance score; and deploying the containerized application code having the improved container configuration to a cloud computing system.

9. The method of claim 8, wherein the performance scores comprise at least one or more of a memory utilization score, a network bandwidth utilization score, an API call volume score, a central processing unit performance score, a graphics processing unit performance score, or a data security score.

10. The method of claim 8, further comprising:

converting the final quantum state from the format of quantum bits to a format of classical binary bits.

11. The method of claim 8, wherein:

the rule defines a plurality of weights; and determining the total performance score for said each container configuration based on the performance scores and the rule comprises:

summing the performance scores multiplied by respective weights.

12. The method of claim 8, wherein a first container configuration of the plurality of container configurations and a second container configuration of the plurality of container configurations comprise different number of container images.

13. The method of claim 12, wherein the first container configuration of the plurality of container configurations and the second container configuration of the plurality of container configurations comprise different number of APIs.

14. The method of claim 8, wherein simulating said each container configuration comprises:

implementing a quantum optimization algorithm.

15. A non-transitory computer-readable medium storing instructions that, when executed by at least one classical processor and at least one quantum processor, cause the at least one classical processor and the at least one quantum processor to:

receive an application code of a legacy application;

containerize the legacy application to generate a containerized application code of a containerized application, wherein containerizing the legacy application comprises:

analyzing the application code to generate a plurality of container configurations for the containerized application, wherein each container configuration comprises a plurality of container images and a plurality of application programming interfaces (APIs), and wherein generating said each container configuration comprises:

determining a plurality of logical units of the legacy application;

clustering the plurality of logical units into a plurality of clusters;

determining a plurality of interaction flows between the plurality of clusters;

generating a respective container image for each cluster; and mapping the plurality of interaction flows to the plurality of APIs;

generate an initial quantum state from the plurality of container configurations;

simulate said each container configuration;

generate a final quantum state from the initial quantum state, wherein the final quantum state comprises performance scores for said each container configuration represented using a format of quantum bits;

determine a total performance score for said each container configuration based on the performance scores and a rule;

determine a highest total performance score;

determine an improved container configuration from the plurality of container configurations based on the highest total performance score; and deploy the containerized application code having the improved container configuration to a cloud computing system.

16. The non-transitory computer-readable medium of claim 15, wherein the performance scores comprise at least one or more of a memory utilization score, a network bandwidth utilization score, an API call volume score, a central processing unit performance score, a graphics processing unit performance score, or a data security score.

17. The non-transitory computer-readable medium of claim 15, wherein the instructions, when executed by the at least one classical processor and the at least one quantum processor, further cause the at least one classical processor and the at least one quantum processor to:

convert the final quantum state from the format of quantum bits to a format of classical binary bits.

18. The non-transitory computer-readable medium of claim 15, wherein:

the rule defines a plurality of weights; and determining the total performance score for said each container configuration based on the performance scores and the rule comprises:

summing the performance scores multiplied by respective weights.

19. The non-transitory computer-readable medium of claim 15, wherein a first container configuration of the plurality of container configurations and a second container configuration of the plurality of container configurations comprise different number of container images.

20. The non-transitory computer-readable medium of claim 15, wherein simulating said each container configuration comprises:

implementing a quantum optimization algorithm.

* * * * *